United States Patent
Munn et al.

[11] Patent Number: 5,525,259
[45] Date of Patent: Jun. 11, 1996

[54] EUROPIUM-DOPED YTTRIUM OXIDE PHOSPHOR

[75] Inventors: Robin W. Munn, Sayre; Richard G. W. Gingerich, Towanda; James Morse, Mylan, all of Pa.

[73] Assignee: GTE Products Corporation, Danvers, Mass.

[21] Appl. No.: 866,880

[22] Filed: Apr. 2, 1992

Related U.S. Application Data

[63] Continuation of Ser. No. 632,306, Dec. 20, 1990, abandoned.

[51] Int. Cl.⁶ ................................................. C09K 11/78
[52] U.S. Cl. ................................................. 252/301.4 R
[58] Field of Search ................................... 252/301.4 R

[56] References Cited

U.S. PATENT DOCUMENTS

| | | | |
|---|---|---|---|
| 3,574,131 | 4/1971 | Ferri et al. | 252/301.4 R |
| 3,870,650 | 3/1975 | Ferri et al. | 252/301.4 R |
| 4,473,518 | 9/1984 | Minagawa et al. | 252/301.4 R |
| 4,585,673 | 4/1986 | Sigai | 428/403 |
| 4,801,398 | 1/1989 | Ohno et al. | 252/301.4 R |

FOREIGN PATENT DOCUMENTS 2349160  4/1975  Germany ......................... 252/301.4 R

*Primary Examiner*—Melissa Bonner
*Attorney, Agent, or Firm*—Robert E. Walter; Elizabeth A. Levy; Robert F. Clark

[57] ABSTRACT

Disclosed is a large size $Y_2O_3$:Eu lamp phosphor as a red component for a water degradation resistant blend of fluorescent phosphors having large sized green phosphor particles and the method for making by blending yttrium oxide and europium oxide with fluxing agents, firing, milling the fired phosphor; sieving the milled phosphor to obtain a phosphor with an average particle size greater than about 5 by Coulter Counter to produce a sieved phosphor, and encapsulated a conformal coating of gamma alumina on said sieved phosphor by vapor chemical vapor deposition to form a resulting coated $Y_2O_3$:Eu phosphor with additional phosphor components including a green phosphor to form a lamp phosphor blend, and applying the blend to a lamp as a water based suspension.

3 Claims, 1 Drawing Sheet

EUROPIUM-DOPED YTTRIUM OXIDE PHOSPHOR

This is a continuation of application Ser. No. 07/632,306, filed on Dec. 20, 1990, now abandoned.

TECHNICAL FIELD OF THE INVENTION

This invention relates to phosphors and more particularly to red emitting fluorescent lamp phosphors.

BACKGROUND OF THE INVENTION

Europium-doped yttrium oxide is widely used in fluorescent lamps as a red-emitting phosphor. Typically, this phosphor is produced in its simplest form, e.g., Type 2345 manufactured by the Chemical & Metallurgical Division of GTE Products Corporation, Towanda, Pa., by firing a commercially obtained mixture of coprecipitated the yttrium (III) oxide and europium (III), and then milling and sieving the fired material to produce the finished phosphor powder. This phosphor powder typically comprises tiny crystallites which have been agglomerated into particles having an average size of 3 to 3.5 by Coulter Counter.

A second form of this phosphor, e.g., Type 2342 manufactured by the Chemical & Metallurgical Division of GTE Products Corporation, Towanda, Pa., is formulated by blending small amounts of chemical fluxing agents, i.e., $Li_2CO_3$, $K_2CO_3$, and $H_3BO_3$, with a commercially obtained coprecipitated mixture of yttrium-europium oxide. When this blend is fired, the $Li_2CO_3$, $K_2CO_3$, and $H_3BO_3$ fluxes enhance the growth of the particles and favor more of a single-crystal morphology for the resultant powder. This powder is also finished by milling and sieving so that its average size is 4.0 to 4.5 by Coulter Counter.

SUMMARY OF THE INVENTION

In accordance with the present invention, there is provided a method for preparing $Y_2O_3$:Eu, the method comprising: blending yttrium oxide and europium oxide with fluxing agents comprising $Li_2CO_3$, $K_2CO_3$, $Na_2CO_3$, $Na_2BO_4$, and sulfur; and firing the blend at a temperature and for a period of time sufficient to form $Y_2O_3$:Eu phosphor.

In a preferred embodiment, the method further comprises milling the fired phosphor; and sieving the milled phosphor to obtain a phosphor with an average particle size greater than about 5 by Coulter Counter. In a most preferred embodiment, the average particle size is greater than about 5 to about 7 by Coulter Counter.

In accordance with another aspect of the present invention there is provided a new and improved $Y_2O_3$:Eu phosphor having an average particle size greater than 5 by Coulter Counter, the europium activator content being from about 3 to about 5 mol % europium.

In accordance with still a further aspect of the invention, there is provided the above-described phosphor, the individual particles of which have been encapsulated by a conformal coating of alumina.

Figure 1:
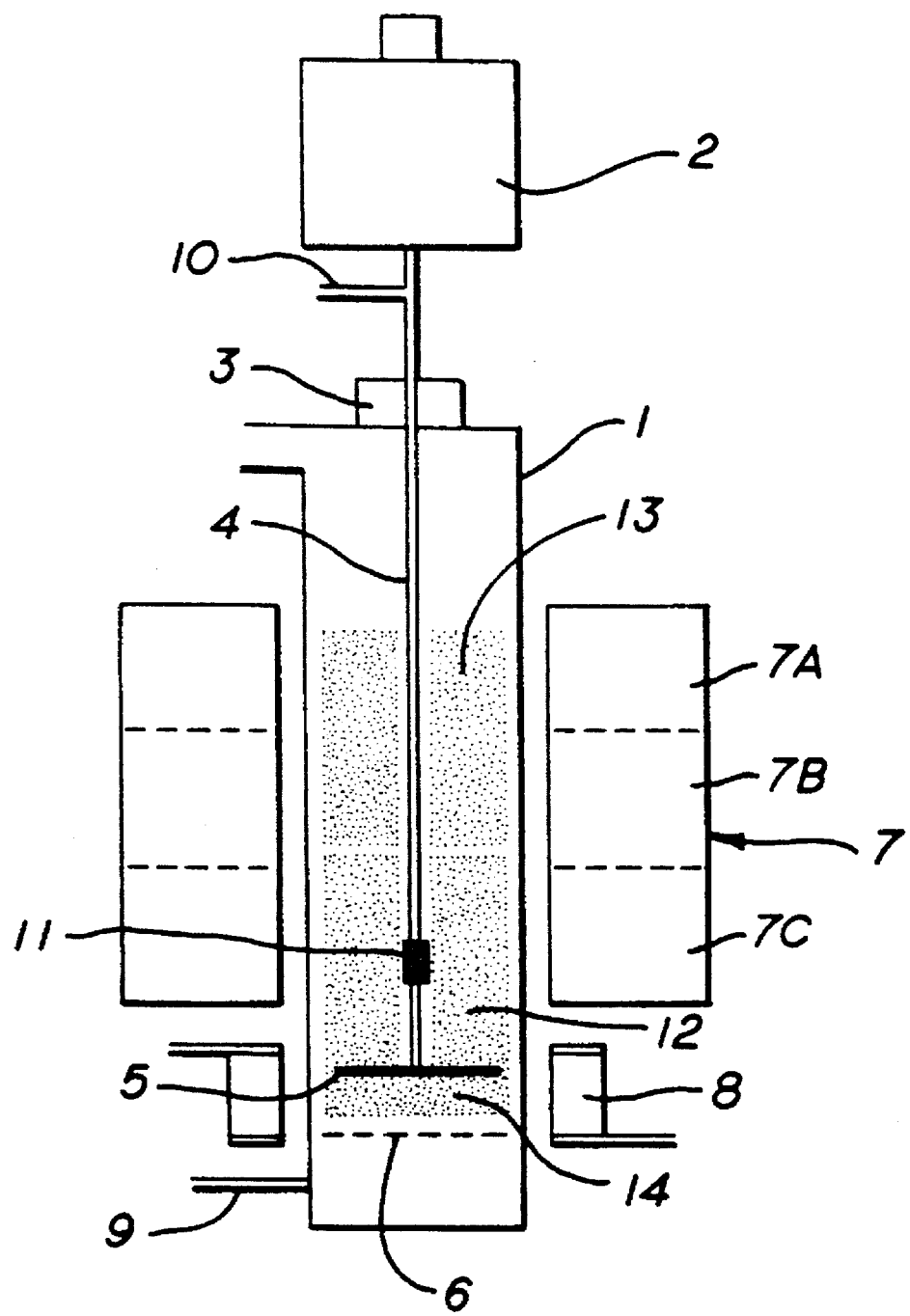
FIG. 1 schematically illustrates a fluid bed reactor used to coat the particles of a phosphor of the present invention.

For a better understanding of the present invention, together with other and further advantages and capabilities thereof, reference is made to the following disclosure and appended claims in connection with the above-described drawing.

DETAILED DESCRIPTION

The $Y_2O_3$:Eu phosphor of the present invention overcomes deficiencies associated with its two above-described predecessors.

GTE Type 2342 phosphor was developed to be used as the red component of triphosphor blends. At the time GTE Type 2342 phosphor was developed, lamp manufacturers blended phosphors in organic-based suspension systems and then coated the organic-based coating suspension including the blended phosphors onto the fluorescent bulbs.

For environmental reasons, lamp manufacturers changed over from organic-based coating suspension system to a water-based suspension system. In the water-based suspension system, use of phosphors such as GTE Type 2342 became a problem because of the existence of residual boron that would leach out and deposit on the surface of the phosphor. The boron would then act as a fire retardant during the bakeout of the phosphor coated bulb, causing a decrease in efficiency of the lamp.

GTE Type 2345 phosphor was then developed to counter this problem. Type 2345 was smaller in particle size than Type 2342 and did not contain any residual boron. But, as described in U.S. patent application Ser. No. 07/632,459, now U.S. Pat. No. 5,126,166, of Dutta, Dullea, and Dale for "METHOD OF REDUCING THE DEGRADATION OF THE RED PHOSPHOR, $Y_2O_3$:EU, IN WATER BASE LAMP SUSPENSIONS," filed on even date herewith, it has been found that water base coating suspensions including Type 2345 phosphor which are held over for future use experience some degradation problems.

Also, with the recent development of a new improved larger particle size green-emitting manganese activated zinc orthosilicate phosphor component (e.g., GTE Type 2288), particle size variation between the green and red components causes segregation of these two different color-emitting phosphors in the coating suspension after being applied to the bulb, resulting in visually detectable end-to-end color variations along the length of the bulb.

The red $Y_2O_3$:Eu phosphor of this invention overcomes the above mentioned problems while also enabling triphosphor lamps to be made using a water base suspension and utilizing the new improved green component without the occurrence of end-to-end color variation.

The fluxing agents called for in the method of the invention provide $Y_2O_3$:Eu having an average particle size which is larger than the average particle size of GTE Type 2342, and which is also compatible with any triphosphor blend component including a component having an average particle size of, for example, from 7 to 9 micrometers, such as the new, improved large-size particle green phosphor.

As described earlier in the Summary of the Invention, the method for preparing $Y_2O_3$:Eu, in accordance with the invention, comprises a first step of blending yttrium oxide and europium oxide with fluxing agents comprising $Li_2CO_3$, $K_2CO_3$, $Na_2CO_3$, $Na_2BO_4$, and sulfur.

The europium oxide and yttrium oxide starting materials may be commercially obtained reagent grade materials, or alternatively, may be prepared by coprecipitating the two oxides from a solution containing the non-oxygen elements of the phosphor, i.e., yttrium and europium, in molar proportions in accordance with the molar proportions of the non-oxygen elements in the phosphor. The coprecipitated mixture can be prepared, for example, by dissolving an yttrium containing compound and an europium containing compound, in relative molar proportions in accordance with the desired finished phosphor formulation, with nitric acid and then coprecipitating the oxide mixture by treatment with oxalic acid.

The fluxing agents are preferably included in the raw batch blend in the following concentrations: greater than 0 to about 3 weight % $Li_2CO_3$, from greater than 0 to about 8 weight % $K_2CO_3$, from greater than 0 to about 6 weight percent $Na_2CO_3$, from greater than 0 to about 5 weight percent $Na_2BO_4$, and from greater than 0 to about 1 weight percent sulfur.

The total fluxing agent content of the raw batch blend preferably represents from about 10 to about 20 weight percent of the blend.

The second step of the method comprises firing the blend of europium oxide, yttrium oxide, and the fluxing agent mixture at a temperature and for a period of time sufficient to form $Y_2O_3$:Eu phosphor.

In a preferred embodiment, the firing step is carried out at a temperature of approximately 2350° F. (1288° C.) for about 5 hours.

In a most preferred embodiment, the method further comprises milling the fired phosphor; and sieving the milled phosphor to obtain a phosphor with an average particle size of about 5 to about 7 by Coulter Counter.

As mentioned above, the method of the invention achieves an average particle size for europium doped yttrium oxide larger than that heretofore available for commercially prepared $Y_2O_3$:Eu phosphor. A particular advantage of this larger particle size $Y_2O_3$:Eu phosphor is that it is particularly well suited for use in triphosphor blends including synthetic willemite phosphor as the green component. Because the europium doped yttrium oxide phosphor of the invention has an average particle size roughly similar to that of synthetic willemite phosphor, the end-to-end color variation heretofore experienced when coating linear fluorescent lamps with a phosphor blend including smaller particle size $Y_2O_3$:Eu, such as Type 2343, and synthetic willemite phosphor is avoided.

The following is exemplary of the method and phosphor of the invention, and is not to be construed as necessarily limiting thereof.

EXAMPLE 1

The following materials were compounded, in the amounts shown, to prepare a blend for firing.

| | |
|---|---|
| Yttrium-Europium Oxide Coprecipitate, 4½ mol % Eu* | 23.000 kg |
| Lithium Carbonate | 0.467 kg |
| Sodium Carbonate | 1.010 kg |
| Sulfur | 0.010 kg |
| Sodium Borate | 0.956 kg |
| Potassium Carbonate | 1.310 kg |
| Total | 26.895 kg |

*obtained from Rhone Poulenc, Newark, N.J.

This blend was placed in alumina crucibles and stoked through a furnace such that it was maintained at a temperature of 2350° F. (1288° C.) for five hours.

The first material was passed through a roll crusher several times and then ball-milled wet for 30 minutes. The mill slurry was sent to a filter press and washed to a conductivity <30 mhos. Finally, the powder was tray-dried and then sieved through a 400 mesh screen. The yield of phosphor (also referred to herein as 234X) product was 21,750 kgs. This yield of 21,750 kgs of phosphor represents a material efficiency of 94.6%. The powder had an average particle size of 5.8 by Coulter Counter (five minute sonified).

It is important to note that although $Li_2CO_3$ and $K_2CO_3$ were used as fluxing agents for Type 2342, the respective concentrations of these two fluxing agents in the method of the invention, as exemplified by this example, are approximately 7 and 10 times greater.

In further contrast to Type 2342, the total concentration of fluxing agents in the method of the invention, as exemplified by this example, is approximately 15 times greater for the method of the invention compared to that previously used to make Type 2343.

EXAMPLE 2

In order for an $Al_2O_3$ coating to be applied to a sample of the phosphor prepared in Example 1, 11.8 kgs of this 234X powder were blended with 0.02% by weight Aluminum Oxide C (ALON C), manufactured-by Degussa, inc., and then loaded into a fluid bed reactor. The $Al_2O_3$ coating was applied to the phosphor by a chemical vapor deposition process carried out in a fluid bed. The method used is similar to that described in the Specific Example that follows.

Subsequent to coating, the coated phosphor is preferably annealed as described in U.S. Pat. No. 4,803,400 of Thomas E. Peters et al., issued 7 Feb. 1989, and assigned to GTE Laboratories Incorporated, the disclosure of which is hereby incorporated herein by reference.

While the coating method described in the Specific Example is preferred, variations of such method can also be used. See, for example, U.S. patent application Ser. No. 07/430,546 of Robin W. Munn, Dale E. Benjamin, A. Gary Sigai, and Silvia E. Lichtensteiger, entitled "METHOD FOR COATING PHOSPHOR PARTICLES," the disclosure of which is hereby incorporated herein by reference, and U.S. Pat. No. 4,585,673 of A. Gary Sigai, issued 29 Apr. 1986, and assigned to GTE Laboratories Incorporated, the disclosure of which is hereby incorporated herein by reference.

SPECIFIC EXAMPLE

A fluid bed reactor, as shown in FIG. 1, was used to apply an alumina coating to the phosphor particles. The fluid bed reactor includes an approximately 4 in ID by 5 ft tall transparent quartz tube for the vessel 1. The reactor includes a vibrator 2 and an agitator 5 to stimulate and control the motion of the phosphor in the fluid bed. The vibrator 2 is a VIBRO-MIXER unit, Model E-2, obtained from CHEMAP, INC., along with the standard gas seal 3. The VIBRO-MIXER is equipped with a rheostat so that the vertical amplitude of the agitator 5 can be adjusted from zero to the maximum 3 mm. For the agitator shaft 4, the VIBRO-MIXER is fitted with a piece of steel tubing long enough so that the agitator 5 is approximately three inches above the porous metal gas distributor plate 6. The agitator 5 is a flat plate 3.6875 inches in diameter with fifteen ¼ in. holes regularly spaced throughout the interior of the disk. The circular holes taper outwardly from a top opening. A portion of the length of the quartz tube is surrounded by a split-tube furnace 7 to provide indirect heat to the fluid bed. The furnace contains three zones of heating, each 12-in. long. (Approximately 20–24" inches of the fluid bed column extended from the bottom of the furnace.) In this test, only the top two zones were utilized while the bottom zone was turned off. An external water cooling coil 8, installed at the bottom of the vessel from the distributor plate 6 to about an inch above the agitator disk 5, was not used.

Nitrogen was passed through a bubbler vessel containing the coating precursor material, in this example, trimethylaluminum (TMA). The resultant vapor-containing as stream was diluted with additional pure nitrogen and then introduced to the reactor through connection 9. Also, oxygen was hooked to the agitator shaft at connection 10 and injected directly into the bed via a porous metal sparger 11.

During the coating of lot Y-105, nitrogen was introduced into the bed and run at about 4 slpm to fluidize the phosphor powder. The temperature of the TMA bubbler was about 44–45 degrees C. The temperature measured for furnace Zone 1 started at about 650 degrees C and dropped to about 633 degrees C. The temperature measured for furnace Zone 2 started at about 765 degrees C, rose to about 890 degrees C after about one-half hour, and dropped to about 595 degrees C. The VIBRO-MIXER power was set at 100% to facilitate the heat-up process. The temperature at area 13 of the bed, measured by a thermocouple, was about 410–430 degrees C during the coating run. (Preferably, the temperature at area 13 of the bed is about 400 degrees C during the coating process.) The temperature of the bed, measured at area 14 of the bed during the coating run by thermocouple, was approximately 309 degrees C. The oxygen flow rate was approximately 11 slpm. A flow of about 6 SLPM of nitrogen was diverted through the TMA bubbler and the vapor-laden bubble exit stream was diluted with additional nitrogen to comprise the fluidizing-coating gas at connection 9. During the coating operation, the operating parameters were continuously monitored and adjusted as necessary to control the reactor within certain preset limits.

The CVD operation was carried out for about 4 hours on the fluidized phosphor such that 2.4% by weight $Al_2O_3$ was deposited on the fluidized phosphor to encapsulate the individual phosphor particles.

The phosphor was removed from the reactor and annealed in quartz boats for four hours at 780° C. in air. For additional information concerning the post-coating annealing step, reference is made to U.S. Pat. No. 4,803,400 of Peters and Hunt, described above.

The $Al_2O_3$ coated, or encapsulated, material described in Example 2 was evaluated in 40 watt T12 lamps, as was standard 2342 phosphor and standard 2345 phosphor. An additional sample of the 234X material, without the CVD coating, was also evaluated in a 40 watt T12 fluorescent lamp.

The lamp test data for these three different lamps are presented in the following table.

TABLE 1

| Sample | Optical Density | Corrected Powder Weight | 0 Hour Lumens | 100 Hour Lumens | % M |
|---|---|---|---|---|---|
| YCX-634 2345 | 80.8 | 5.13 | 2810 | 2760 | 98.2 |
| YCX-101 2342 | 80.6 | 6.12 | 2893 | 2838 | 98.1 |
| Y-107 234X | 79.9 | 8.74 | 2828 | 2803 | 99.1 |

TABLE 1-continued

| Sample | Optical Density | Corrected Powder Weight | 0 Hour Lumens | 100 Hour Lumens | % M |
|---|---|---|---|---|---|
| Y-105 234X* | 79.7 | 8.83 | 2829 | 2782 | 98.3 |

*denotes the material has been encapsulated by an $Al_2O_3$ protective coating. See Example 2.

Table 1 reports the optical density of the phosphor coating, as measured by an optical density test kit, which parameter and measurement technique are well known in the art. The data reported under the headings "0 Hour Lumen" and "100 Hour Lumen" are the lumen output measured after the stated number hours of lamp operation. The heading "%M" represents the maintenance of the lamp as a percentage based upon the lumens measured after 100 hours of lamp operation relative to the initial lumen output.

In Table 1, sample YCX-634 contains a coating of GTE Type 2345 phosphor; sample YCX-101 contains a coating of GTE Type 2342 phosphor; sample Y-107 contains a coating of the phosphor described in Example 1; and sample Y-105 contains the coated phosphor described in Example 2.

Each data entry is the Table 1 represents represents the average data for four (4) lamps. The coatings in all of the lamps used to generate the data summarized in Table 1 were prepared from water base suspensions including 2% by weight ALON C, using conventional lamp coating techniques.

From the data, it is apparent that the $Y_2O_3$:Eu phosphor of the present invention is comparable to Type 2342 in lumen output, and may indeed possess a maintenance advantage thereover.

To determine the effectiveness of the $Al_2O_3$ coating to prevent degradation of the phosphor in a water base coating suspension, the water-soluble yttrium concentration was measured by atomic absorption. The Y-107 sample exhibited a reading of 0.0022% Y while the Y-105 sample was virtually undetectable at <0.0007%.

While there has been shown and described what are at present considered the preferred embodiments of the invention, it will be apparent to those skilled in the art that various changes and modifications may be made therein without departing from the scope of the invention as defined by the appended claims.

What is claimed is:

1. A method for preparing large size $Y_2O_3$:Eu lamp phosphor as a red component for a water degradation resistant blend of fluorescent phosphors having large sized green phosphor particles having an average particle size of from 7 to 9 micrometers, the method comprising:

blending yttrium oxide and europium oxide with fluxing agents consisting essentially of from greater than 0 to about 3 weight percent $Li_2CO_3$, from greater than 0 to about 8 weight percent $K_2CO_3$, from greater than 0 to about 6 weight percent $Na_2CO_3$, from greater than 0 to about 5 weight percent $Na_2BO_4$, and from greater than 0 to about 1 weight percent sulfur wherein the fluxing agents represent from about 10 to about 20 weight percent of the blend, the europium oxide being included in an amount to provide an activator concentration in the finished phosphor of from about 3 to about 5 mole percent;

firing the blend at a temperature and for a period of time sufficient to form $Y_2O_3$:Eu phosphor;

milling the fired phosphor;

sieving the milled phosphor to obtain a phosphor with an average particle size greater than about 5 micrometers by Coulter Counter to produce a sieved phosphor, and encapsulating a conformal coating of gamma alumina on said sieved phosphor by vapor chemical vapor deposition, the coating representing from about 2 to about 3 weight percent of the coated phosphor weight;

mixing said resulting coated $Y_2O_3$:Eu phosphor with additional phosphor components including a green-emitting manganese activated zinc orthosilicate phosphor having an average particle size of from 7 to 9 micrometers to form a lamp phosphor blend; and applying said blend to a lamp as a water based suspension.

2. A method in accordance with claim 1 wherein the milled phosphor is sieved to obtain a phosphor with an average particle size of from greater than about 5 to about 7 micrometers by Coulter Counter.

3. A method in accordance with claim 2 wherein the firing step is carried out at a temperature of approximately 2350° F. (1288° C.) for about 5 hours.

* * * * *